United States Patent
Miyata et al.

(10) Patent No.: US 9,661,157 B2
(45) Date of Patent: May 23, 2017

(54) APPARATUS, METHOD, AND NON-TRANSITORY COMPUTER READABLE MEDIUM

(71) Applicant: FUJI XEROX Co., Ltd., Tokyo (JP)

(72) Inventors: Shigeo Miyata, Kanagawa (JP); Koichi Sato, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/725,741

(22) Filed: May 29, 2015

(65) Prior Publication Data
US 2016/0100064 A1 Apr. 7, 2016

(30) Foreign Application Priority Data
Oct. 1, 2014 (JP) ................................. 2014-203226

(51) Int. Cl.
*G06F 3/12* (2006.01)
*H04N 1/00* (2006.01)
*H04N 1/327* (2006.01)

(52) U.S. Cl.
CPC ..... *H04N 1/00095* (2013.01); *H04N 1/00474* (2013.01); *H04N 1/00482* (2013.01); *H04N 1/3275* (2013.01); *H04N 2201/0094* (2013.01)

(58) Field of Classification Search
USPC .................... 358/1.13; 705/316; 715/23, 273
See application file for complete search history.

(56) References Cited

U.S. PATENT DOCUMENTS

| | | | |
|---|---|---|---|
| 7,995,248 B2 | 8/2011 | Oguri | |
| 2001/0022665 A1* | 9/2001 | Yajima | H04N 1/00209 358/1.13 |
| 2005/0179957 A1* | 8/2005 | Matsuda | H04N 1/00427 358/400 |
| 2007/0214508 A1* | 9/2007 | Fukui | H04N 1/00501 726/28 |
| 2008/0170271 A1* | 7/2008 | Lee | G06Q 10/107 358/402 |
| 2009/0201557 A1* | 8/2009 | Honma | H04N 1/00244 358/402 |

(Continued)

FOREIGN PATENT DOCUMENTS

| | | | |
|---|---|---|---|
| JP | 2001345977 A | 12/2001 | |
| JP | 2008-148052 A | 6/2008 | |

(Continued)

OTHER PUBLICATIONS

Communication dated Sep. 6, 2016, issued by the Japan Patent Office in corresponding Japanese Application No. 2015-171237.

*Primary Examiner* — Jerome Grant, II
(74) *Attorney, Agent, or Firm* — Sughrue Mion, PLLC

(57) ABSTRACT

An apparatus includes an association unit and a transmission controller. The association unit associates an image among one or more images with at least one piece of transmission information among one or more pieces of transmission information on a display in accordance with a user operation. The one or more pieces of transmission information are information on the one or more images and each include a transmission method and a transmission destination. The transmission controller causes transmission of the image in accordance with the at least one piece of transmission information associated with the image.

21 Claims, 9 Drawing Sheets

(56) References Cited

U.S. PATENT DOCUMENTS

| | | | | |
|---|---|---|---|---|
| 2009/0319889 A1* | 12/2009 | Nakada | ............... | H04N 1/00411 |
| | | | | 715/273 |
| 2010/0306250 A1* | 12/2010 | Mizunashi | .......... | H04L 12/5835 |
| | | | | 707/769 |
| 2011/0181904 A1* | 7/2011 | Shimasaki | ............. | G03G 21/02 |
| | | | | 358/1.14 |
| 2012/0233537 A1* | 9/2012 | Kawabata | .......... | H04N 1/00408 |
| | | | | 715/234 |
| 2013/0070295 A1* | 3/2013 | Maruyama | ............... | H04N 1/00 |
| | | | | 358/1.15 |
| 2014/0169540 A1* | 6/2014 | Suga | ................... | H04M 7/0024 |
| | | | | 379/93.09 |
| 2014/0229575 A1* | 8/2014 | Yamahara | ............... | G06Q 10/06 |
| | | | | 709/217 |
| 2015/0095244 A1* | 4/2015 | Heine, III | ............ | G06Q 50/167 |
| | | | | 705/316 |

FOREIGN PATENT DOCUMENTS

| | | | |
|---|---|---|---|
| JP | 2009124316 A | 6/2009 | |
| WO | 2005057955 | * 6/2005 | ............... H04Q 7/20 |

* cited by examiner

FIG. 7

| NO. | IMAGE ID | TRANSMISSION INFORMATION ||
| --- | --- | --- | --- |
| | | TRANSMISSION METHOD | TRANSMISSION DESTINATION |
| 1 | A | EMAIL | ccc@xx.co.jp |
| 2 | B | FAX | 000-000-000 |
| 3 | A | FAX | 111-123-444 |
| 4 | | | |

APPARATUS, METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2014-203226 filed Oct. 1, 2014.

BACKGROUND

Technical Field

The present invention relates to an apparatus, a method, and a non-transitory computer readable medium.

SUMMARY

According to an aspect of the invention, there is provided an apparatus including an association unit and a transmission controller. The association unit associates an image among one or more images with at least one piece of transmission information among one or more pieces of transmission information on a display in accordance with a user operation. The one or more pieces of transmission information are information on the one or more images and each include a transmission method and a transmission destination. The transmission controller causes transmission of the image in accordance with the at least one piece of transmission information associated with the image.

BRIEF DESCRIPTION OF THE DRAWINGS

An exemplary embodiment of the present invention will be described in detail based on the following figures, wherein:

FIG. 7 illustrates an example of a transmission list stored in a transmission list memory;

DETAILED DESCRIPTION

An exemplary embodiment of the present invention will be described hereinafter with reference to the drawings. An apparatus according to this exemplary embodiment is described in the context of an image transmitting apparatus as an example. The apparatus may be any other apparatus such as an information processing apparatus.

Figure 1:
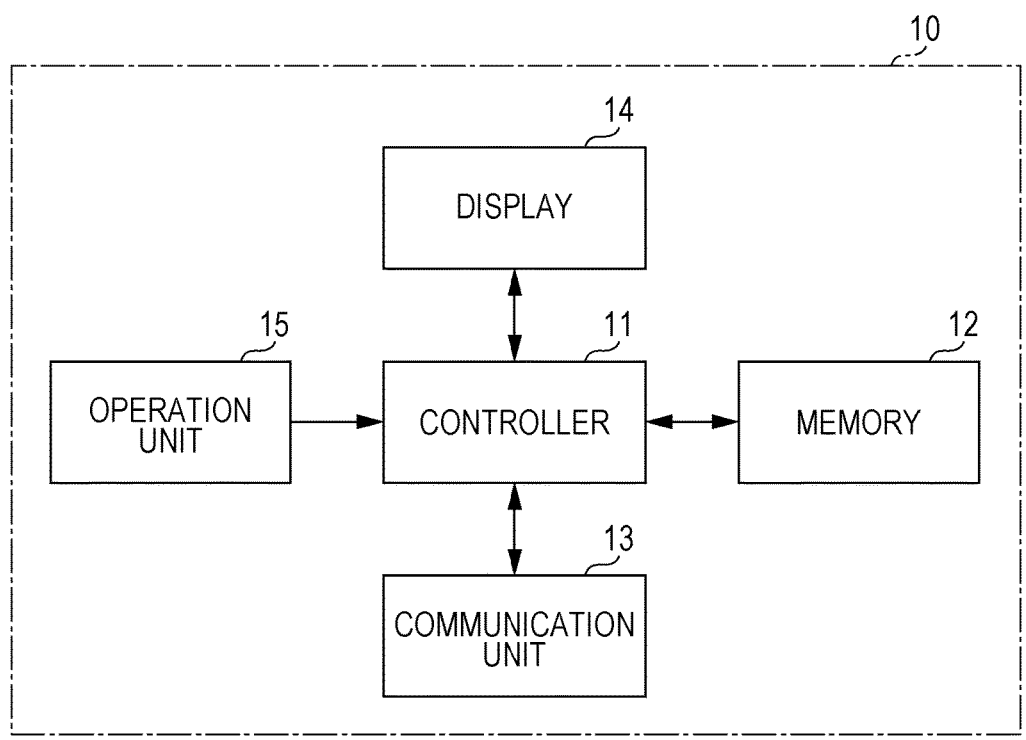
FIG. 1 illustrates an example hardware configuration of an image transmitting apparatus according to an exemplary embodiment.

An image transmitting apparatus 10 according to this exemplary embodiment may be implemented as, for example, a personal computer, a multi-function peripheral, or a facsimile (fax) machine. FIG. 1 illustrates an example hardware configuration of the image transmitting apparatus 10 according to this exemplary embodiment. As illustrated in FIG. 1, the image transmitting apparatus 10 according to this exemplary embodiment includes a controller 11, a memory 12, a communication unit 13, a display 14, and an operation unit 15.

The controller 11 may be, for example, a central processing unit (CPU), and is configured to perform various types of information processing in accordance with a program stored in the memory 12. In this exemplary embodiment, a specific example of a process performed by the controller 11 will be described below.

The memory 12 includes, for example, a memory element such as a random access memory (RAM) or a read-only memory (ROM), a hard disk, and so forth. The memory 12 holds a program executed by the controller 11 and various kinds of data. The memory 12 also operates as a work memory of the controller 11.

The communication unit 13 may be, for example, a network interface such as a local area network (LAN) card, and is configured to transmit and receive information to and from another information processing apparatus via a communication medium such as a LAN or a wireless communication network.

The display 14 may be, for example, a liquid crystal display, and is configured to display information in accordance with instructions input from the controller 11.

The operation unit 15 may be, for example, a mouse, a keyboard, a touch panel, or the like, and is configured to output information corresponding to an operation performed by a user to the controller 11.

Figure 2:
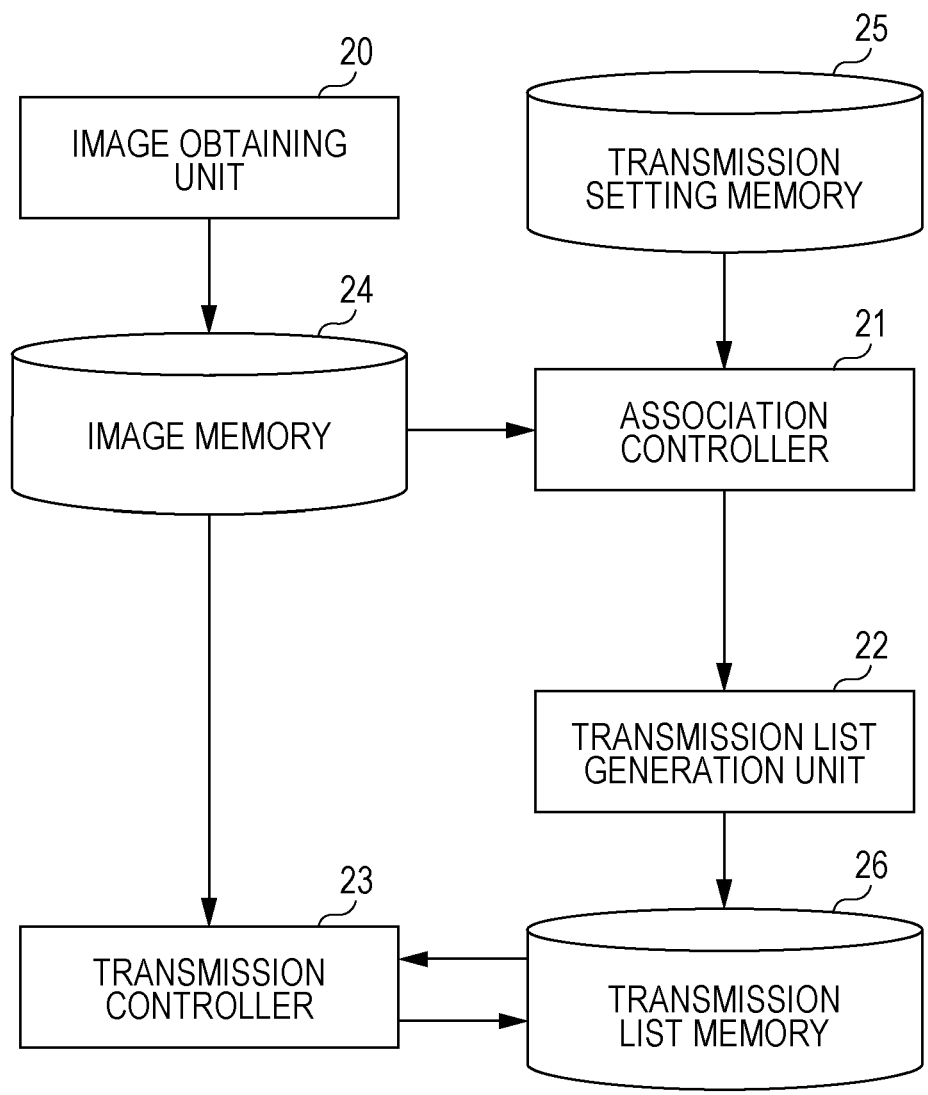
FIG. 2 is a functional block diagram illustrating an example of functions implemented by the image transmitting apparatus according to this exemplary embodiment.

A specific example of functions implemented by the image transmitting apparatus 10 will be described hereinafter. FIG. 2 is a functional block diagram illustrating an example of functions implemented by the image transmitting apparatus 10 according to this exemplary embodiment. As illustrated in FIG. 2, the image transmitting apparatus 10 according to this exemplary embodiment includes, as functions, for example, an image obtaining unit 20, an association controller 21, a transmission list generation unit 22, a transmission controller 23, an image memory 24, a transmission setting memory 25, and a transmission list memory 26. Among the illustrated functions, the image obtaining unit 20, the association controller 21, the transmission list generation unit 22, and the transmission controller 23 are implemented by the controller 11 executing a program stored in the memory 12. The program is supplied to the image transmitting apparatus 10 via a computer-readable information storage medium such as an optical disk, a magnetic disk, a magnetic tape, a magneto-optical disk, or a flash memory or via a communication medium such as the Internet. The image memory 24, the transmission setting memory 25, and the transmission list memory 26 are implemented by the memory 12.

The image obtaining unit 20 obtains images such as a scan image obtained through scanning and a data image stored in advance in the memory 12. One or more images obtained by the image obtaining unit 20 are saved to the image memory 24.

The association controller 21 obtains an image to be transmitted from among the images stored in the image memory 24, and associates the image to be transmitted with one or more pieces of transmission information each indicating transmission settings in which the image to be transmitted is transmitted. One or more images among the images obtained by the image obtaining unit 20 are to be transmitted, by way of example. An image to be transmitted may be a partial image produced by removing part of an image obtained by the image obtaining unit 20 or may be a modified image produced by modifying the partial image. The transmission settings include, for example, a transmission method in which the image to be transmitted is transmitted, and a transmission destination to which the image to be transmitted is transmitted. Specific examples of the transmission method include email transmission, facsimile transmission, and transmission to a server. The transmission destination is identified by, for email transmission or facsimile transmission, an email address or a facsimile number, or by, for transmission to a server, information (e.g., an Internet protocol (IP) address) indicating the location of the server. The transmission settings, which may be transmission information to be associated with the image to be transmitted, are stored in advance in the transmission setting memory 25, by way of example.

Figure 3:
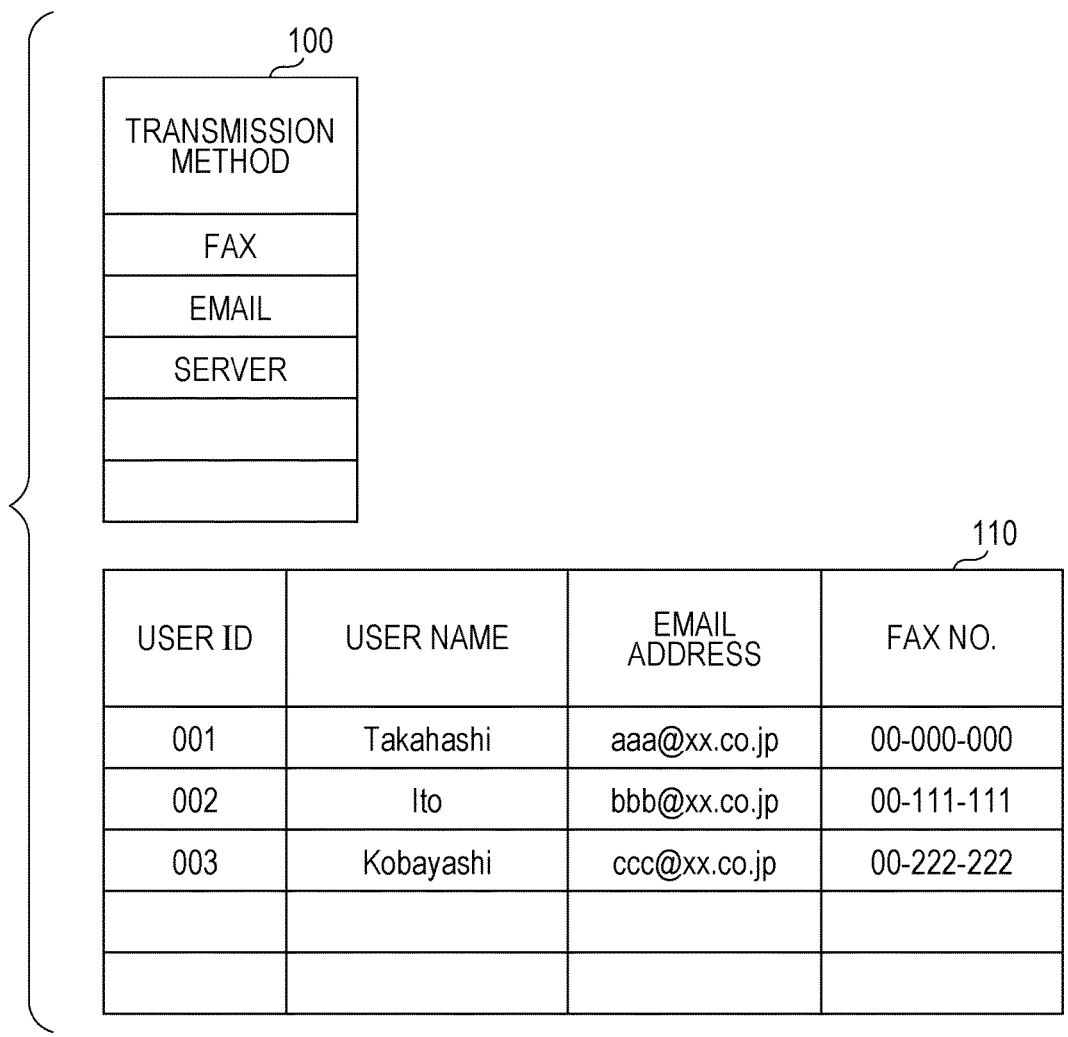
FIG. 3 illustrates an example of transmission settings stored in a transmission setting memory.

FIG. 3 illustrates an example of the transmission settings stored in the transmission setting memory 25. As illustrated by way of example in FIG. 3, the transmission settings include transmission method information 100 and transmission destination information 110. The transmission method information 100 is used for the association of various transmission methods. The transmission destination information 110 is used for the association of user IDs, user names, email addresses, and facsimile numbers. The transmission destination information 110 is user information on a user who may be a destination user to which the image to be transmitted is transmitted, and may be information obtained from, for example, an address book or user management information. Here, information created by a combination of a transmission method and a transmission destination is transmission information.

Figure 4:
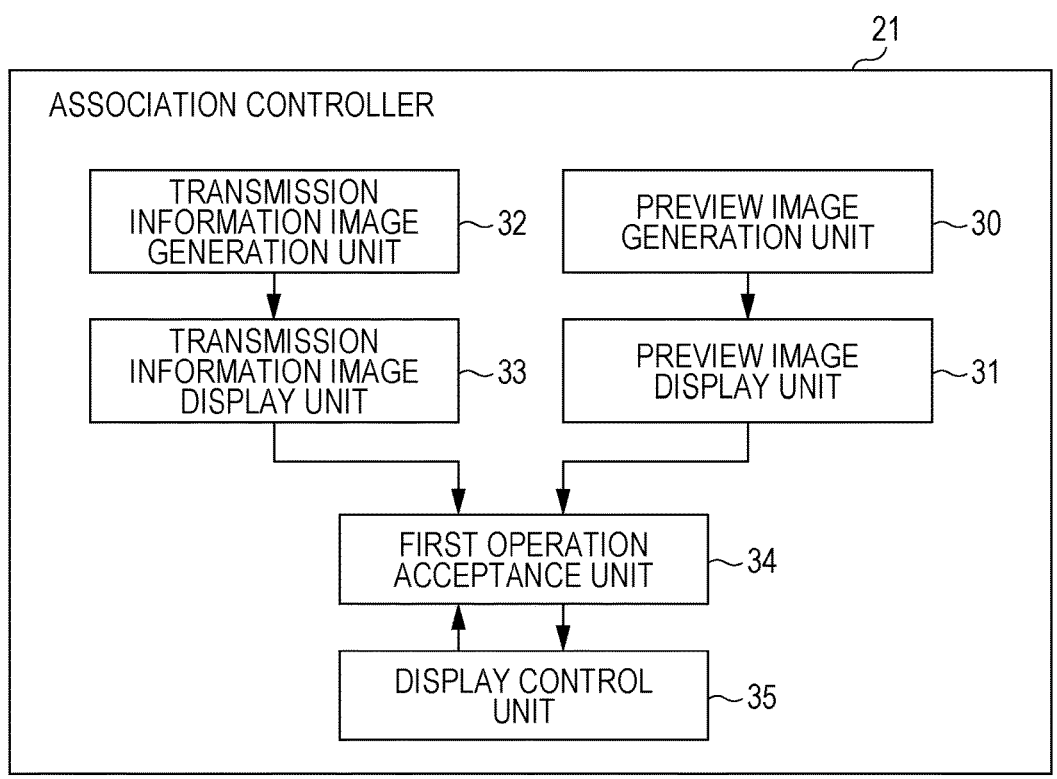
FIG. 4 is a functional block diagram illustrating an example of functions implemented by an association controller.

A specific example of a process for associating transmission information with an image to be transmitted, which is performed by the association controller 21, will be described. FIG. 4 is a functional block diagram illustrating an example of functions implemented by the association controller 21. As illustrated in FIG. 4, the association controller 21 includes a preview image generation unit 30, a preview image display unit 31, a transmission information image generation unit 32, a transmission information image display unit 33, a first operation acceptance unit 34, and a display control unit 35.

The preview image generation unit 30 generates a preview image 60 based on an image to be transmitted among the obtained images saved in the image memory 24. The preview image 60 is an image to be displayed on the display 14 of the image transmitting apparatus 10 to allow a user to check the content of the image to be transmitted. The preview image 60 is generated for each image to be transmitted. The preview image generation unit 30 may reduce and compress the image to be transmitted in accordance with the display size of the display 14 or the number of output colors to generate a preview image 60. The preview image 60 may have the same image format as the image to be transmitted, or may have a different image format. Any of various image compression formats such as Joint Photographic Experts Group (JPEG) and Graphics Interchange Format (GIF) may be used.

The preview image display unit 31 displays the preview image 60 generated by the preview image generation unit 30 on the display 14.

The transmission information image generation unit 32 generates a transmission information image 50 based on the transmission settings stored in the transmission setting memory 25. The transmission information image 50 is an image to be displayed on the display 14 of the image transmitting apparatus 10. Specifically, a transmission information image 50 indicating a piece of transmission information created by a combination of each of the transmission methods and each of the transmission destinations, which are included in the transmission settings illustrated by way of example in FIG. 3, is generated.

The transmission information image display unit 33 displays the transmission information image 50 generated by the transmission information image generation unit 32 on the display 14.

The first operation acceptance unit 34 accepts an operation performed by a user on an association screen. The association screen is a screen on which preview images 60 displayed by the preview image display unit 31 and transmission information images 50 displayed by the transmission information image display unit 33 are displayed. Specifically, the first operation acceptance unit 34 accepts an association operation for associating the transmission information images 50 and the preview images 60, or a display control operation for changing an image to be displayed on the display 14. The user performs an operation by using the operation unit 15.

Figure 5:
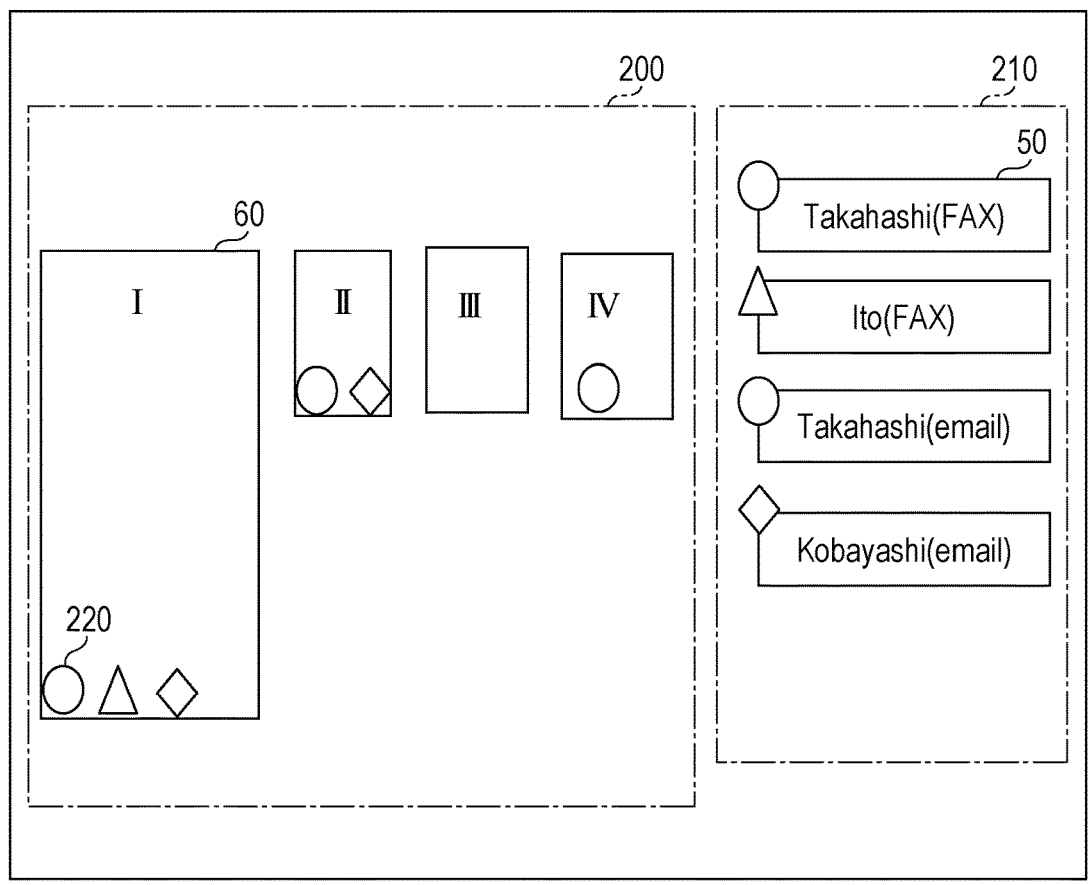
FIG. 5 illustrates an example of an association screen.

FIG. 5 illustrates an example of the association screen. As illustrated by way of example in FIG. 5, the association screen has a preview image area 200 for displaying the preview images 60, and a transmission information image area 210 for displaying the transmission information images 50. In FIG. 5, the preview images 60, each of which is generated for an image to be transmitted, are displayed in the preview image area 200. The transmission information images 50 are each an image in which a transmission method is associated with a destination user name, or may be an image in which a transmission method is associated with a destination user ID or is associated with a destination email address or a destination facsimile number. The transmission information images 50 may be displayed in alphabetical order, in order of use frequency, in order of favorite, or the like, and the display order of the transmission information images 50 may be changed.

When a user drags and drops a transmission information image 50 onto a preview image 60 with the mouse, their finger, or the like, the first operation acceptance unit 34 accepts an association operation for associating the transmission information image 50 with the preview image 60. When the first operation acceptance unit 34 accepts the association operation, information indicating the transmission information image 50 and the preview image 60 on which the association operation is to be performed is output. When the first operation acceptance unit 34 accepts the association operation, furthermore, information indicating the association of the preview image 60 and the transmission information image 50 on which the association operation is to be performed is associated with the preview image 60. In FIG. 5, for example, icons 220 are displayed in the preview image 60 as information indicating the association of the preview image 60 and the transmission information images 50. The icons 220 help the user understand that the transmission information images 50 are associated with the preview image 60. Each of the icons 220 has a different style corresponding to one of the destination users, by way of example. The user is able to perform an association operation as desired, and multiple transmission information images 50 may be associated with a single preview image 60 or the same transmission information image 50 may be associated with multiple preview images 60. Only preview images 60 may be basically displayed on the display 14, and, while the user points to or specifies any of the preview images 60 with the mouse, their finger, or the like, transmission information images 50 may be displayed. Also, a transmission information image 50 and a preview image 60 may be associated by dragging and dropping the preview image 60 onto the transmission information image 50.

Further, the transmission information images 50 may be displayed in such a manner that an image representing a transmission method (e.g., "FAX") and images representing transmission destinations (e.g., "Takahashi" and "Ito") are separately displayed. For example, when a user selects the image representing the transmission method "FAX", images representing transmission destination candidates (e.g., "Takahashi" and "Ito") corresponding to the transmission method "FAX" may be displayed. Here, the transmission destination information stored in the transmission setting memory 25 may be referred to, and user names or user IDs associated with "facsimile numbers" may be displayed as transmission destination candidates. When the user selects a desired transmission destination from among the transmission destination candidates, the selected transmission method and the selected transmission destination may be associated, so that the user is able to drag and drop the associated transmission method and transmission destination onto the preview image 60 on which an association operation is to be performed. When a user selects an image representing a transmission destination (e.g., "Takahashi"), images representing transmission method candidates (e.g., "FAX" and "email") corresponding to the selected transmission destination may be displayed. Here, the transmission destination information stored in the transmission setting memory 25 may be referred to, and the email address and the facsimile number associated with the user name "Takahashi" may be displayed as transmission method candidates. When the user selects a transmission method from among the transmission method candidates, the selected transmission destination and the selected transmission method may be associated to enable the user to drag and drop the associated transmission destination and transmission method onto the preview image 60 on which an association operation is to be performed.

Further, when a user specifies any of the transmission information images 50 by, for example, clicking or tapping it with the mouse, their finger, or the like while the association screen is being displayed on the display 14, the first operation acceptance unit 34 accepts a display control operation for changing an image to be displayed on the display 14. When the first operation acceptance unit 34 accepts the display control operation, information indicating the transmission information image 50 on which the display control operation is to be performed is output to the display control unit 35.

The display control unit 35 changes an image to be displayed on the display 14 in accordance with the information output from the first operation acceptance unit 34 upon acceptance of the display control operation performed by the user. Here, the display control unit 35 displays, on the display 14, a transmission information image association screen including the preview image 60 associated with the transmission information image 50 on which the display control operation is to be performed.

Figure 6:
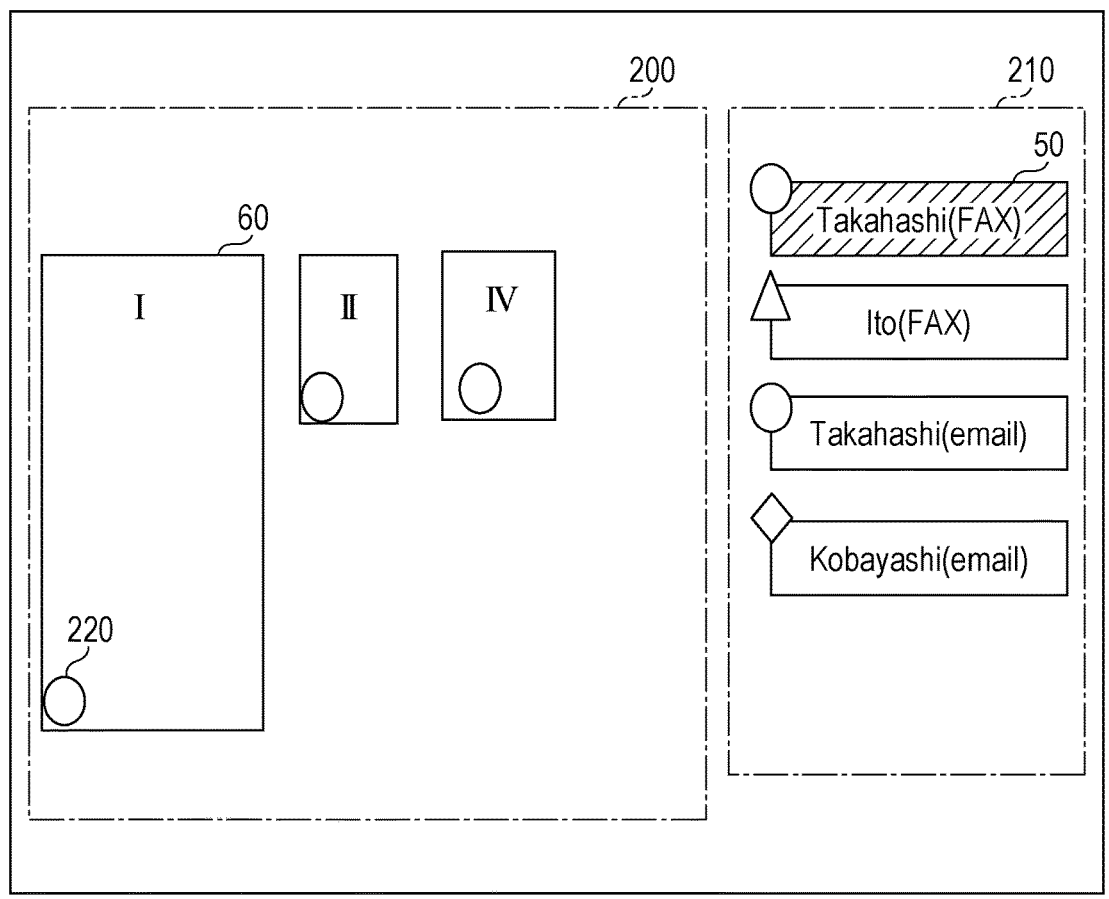
FIG. 6 illustrates an example of a transmission information image association screen.

FIG. 6 illustrates an example of the transmission information image association screen. As illustrated in FIG. 6, the transmission information image association screen has a preview image area 200 for displaying preview images 60, and a transmission information image area 210 for displaying transmission information images 50. FIG. 6 illustrates a transmission information image association screen displayed by the display control unit 35 when the display control operation is to be performed on the transmission information image "Takahashi (FAX)" illustrated in FIG. 5. In FIG. 6, the transmission information image "Takahashi (FAX)" is associated with the first, second, and fourth preview images 60. In this case, as illustrated in FIG. 6, the display control unit 35 displays only the first, second, and fourth preview images 60 associated with the transmission information image "Takahashi (FAX)".

Furthermore, in the case where the transmission information images 50 are displayed on the association screen illustrated in FIG. 5 in such a manner that images representing the transmission methods and images representing the transmission destinations are separately displayed, a transmission information image association screen corresponding to a transmission method or a transmission destination may be displayed. Specifically, when a user specifies an image (e.g., "Takahashi") representing any of the transmission destinations, only a preview image 60 associated with the image "Takahashi" representing the transmission destination may be displayed in the preview image area 200 on the transmission information image association screen. Further, when a user specifies an image (e.g., "FAX") representing any of the transmission methods, only a preview image 60 associated with the image "FAX" representing the transmission method may be displayed in the preview image area 200 on the transmission information image association screen.

In addition, a transmission information image 50 on which the display control operation is to be performed among the transmission information images 50 displayed in the transmission information image area 210 is displayed in a highlighted manner to help identify the display of a preview image 60 associated with the transmission information image 50. When a user specifies the transmission information image 50 displayed in a highlighted manner by, for example, clicking or tapping it, the screen displayed on the display 14 is returned to the association screen. When a user specifies a transmission information image 50 on which the display control operation is not to be performed among the transmission information images 50 displayed in the transmission information image area 210 by, for example, clicking or tapping it, the display control unit 35 displays a preview image 60 associated with the specified transmission information image 50.

The display control unit 35 may display a preview image 60 in a manner corresponding to the transmission method indicated by a transmission information image 50 on which the display control operation is to be performed. Specifically, in a case where the transmission method indicated by the transmission information image 50 on which the display control operation is to be performed is facsimile transmission, the display control unit 35 converts the preview image 60 into an image in a style of being actually displayed for facsimile transmission (such as into a monochrome or black-and-white image or a low-resolution image), before displaying the preview image 60. Also in a case where the transmission method indicated by the transmission information image 50 on which the display control operation is to be performed is email transmission, the display control unit 35 may convert the preview image 60 into an image in a style of being actually attached for email transmission (such as into a compressed image for display), before displaying the preview image 60.

The transmission list generation unit 22 generates a transmission list including multiple transmission units by associating transmission information with an image to be transmitted in accordance with the information output from the first operation acceptance unit 34 upon acceptance of an association operation performed by a user. The transmission list generation unit 22 stores, in a transmission list, a transmission unit in which an image to be transmitted and a piece of transmission information corresponding to a preview image 60 and a transmission information image 50 on which the association operation is to be performed, respectively, are associated with each other. In a transmission unit, an image to be transmitted is associated with a piece of transmission information in one-to-one correspondence. That is, if the association controller 21 associates multiple pieces of transmission information with a single image to be transmitted, multiple transmission units in which the image to be transmitted is associated with each of the pieces of transmission information are stored in the transmission list. The transmission list generated by the transmission list generation unit 22 is stored in the transmission list memory 26.

FIG. 7 illustrates an example of the transmission list stored in the transmission list memory 26. As illustrated in FIG. 7, the transmission list includes multiple transmission units. In each of the transmission units, a number indicating the order of transmission, an image ID that is identification information identifying an image to be transmitted, and a piece of transmission information associated with the image to be transmitted which is identified by the image ID are associated with one another. Each piece of transmission information includes a transmission method and a transmission destination. In the transmission list illustrated in FIG. 7, images to be transmitted which correspond to the transmission units are transmitted in order of the numbers (e.g., sequentially starting from number 1), by way of example.

After a transmission list is generated by the transmission list generation unit 22, the transmission controller 23 sequentially transmits images to be transmitted which are associated with pieces of transmission information on the basis of the generated transmission list in accordance with the pieces of transmission information. The term "after a transmission list is generated by the transmission list generation unit 22" refers to a time after the first operation acceptance unit 34 in the association controller 21 has completed the acceptance of all the association operations performed by a user and the generation of a transmission list has been completed. The transmission controller 23 transmits an image to be transmitted for each transmission unit included in the transmission list. For example, in the case of the transmission of images to be transmitted based on the transmission list illustrated in FIG. 7, the transmission controller 23 transmits the images to be transmitted which are identified by the image IDs in order starting from the transmission unit of number 1 in accordance with the pieces of transmission information associated with the images to be transmitted. That is, when transmitting the transmission unit of number 1, the transmission controller 23 obtains the image to be transmitted which is identified by the image ID "A" from the image memory 24, and transmits the image to be transmitted to "ccc@xx.co.jp" via email.

Figure 8:
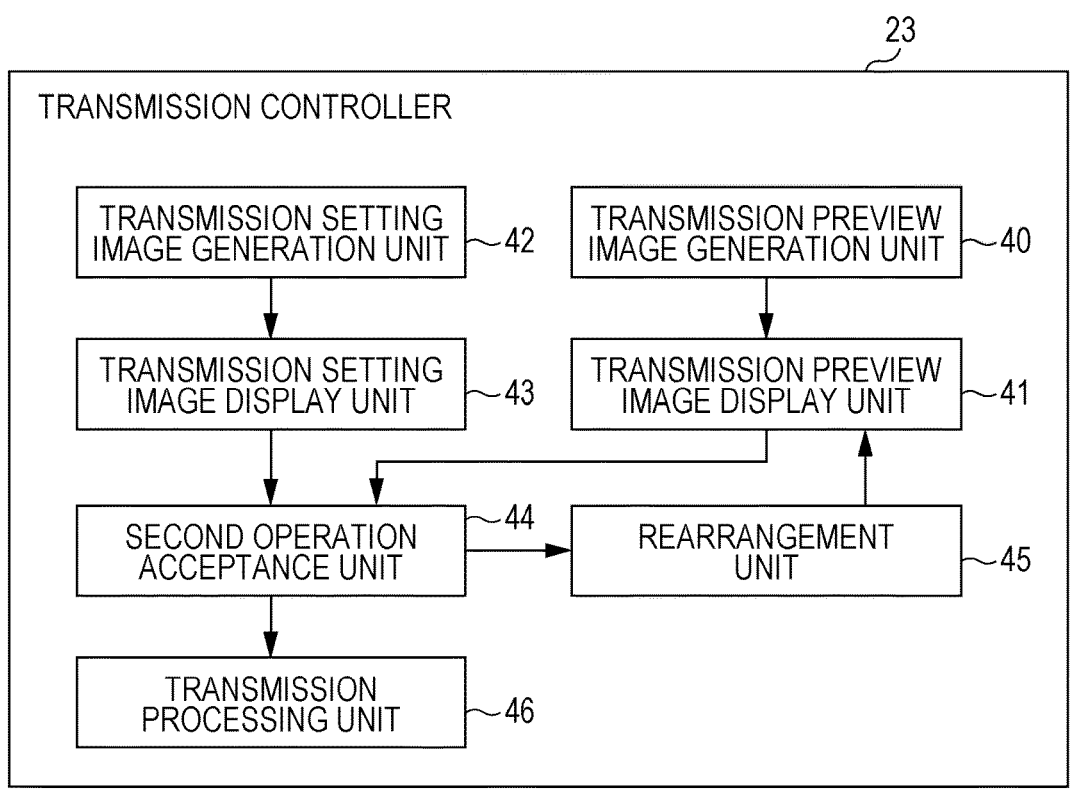
FIG. 8 is a functional block diagram illustrating an example of functions implemented by a transmission controller.

A specific example of a process for the transmission of an image to be transmitted, which is executed by the transmission controller 23, will be described. FIG. 8 is functional block diagram illustrating an example of functions implemented by the transmission controller 23. As illustrated in FIG. 8, the transmission controller 23 includes a transmission preview image generation unit 40, a transmission preview image display unit 41, a transmission setting image generation unit 42, a transmission setting image display unit 43, a second operation acceptance unit 44, a rearrangement unit 45, and a transmission processing unit 46.

The transmission preview image generation unit 40 generates a transmission preview image 70 based on an image to be transmitted among the obtained images saved in the image memory 24. The transmission preview image 70 is an image to be displayed on the display 14 of the image transmitting apparatus 10 to allow a user to check the content of a transmission unit included in a transmission list stored in the transmission list memory 26. The transmission preview image generation unit 40 generates a transmission preview image 70 of an image to be transmitted which is identified by an image ID included in a transmission unit in a style corresponding to the type of the transmission method. Specifically, a transmission preview image 70 of an image to be transmitted with which facsimile transmission is associated as a transmission method is generated in a style of being displayed for facsimile transmission, such as an image displayed in monochrome or an image displayed with low resolution. The transmission preview image generation unit 40 may reduce and compress the image to be transmitted in accordance with the display size of the display 14 or the number of output colors to generate the transmission preview image 70. The transmission preview image 70 may have the same image format as the image to be transmitted, or may have a different image format. Any of various image compression formats such as JPEG and GIF may be used.

The transmission preview image display unit 41 displays, on the display 14, transmission preview images 70 generated by the transmission preview image generation unit 40 on the basis of the transmission list stored in the transmission list memory 26. The transmission preview image display unit 41 displays the transmission preview images 70 in order of the numbers in the transmission list. That is, the transmission preview images 70 are displayed in order of being actually transmitted. The transmission preview image display unit 41 further displays transmission preview images 70 associated with information indicating pieces of transmission information (e.g., the icons 220 or the transmission information images 50) included in the transmission units.

The transmission setting image generation unit 42 generates a transmission setting image based on the transmission settings stored in the transmission setting memory 25. The transmission setting image is an image to be displayed on the display 14 of the image transmitting apparatus 10. Specifically, transmission method images 80 indicating the transmission methods included in the transmission settings and transmission destination images 90 indicating the transmission destinations included in the transmission settings, which are illustrated by way of example in FIG. 3, are generated.

The transmission setting image display unit 43 displays, on the display 14, the transmission method images 80 and the transmission destination images 90 generated by the transmission setting image generation unit 42.

The second operation acceptance unit 44 accepts a user operation performed on a transmission control screen. The transmission control screen is a screen on which the transmission preview images 70 displayed by the transmission preview image display unit 41, the transmission method images 80 displayed by the transmission setting image display unit 43, and the transmission destination images 90 displayed by the transmission setting image display unit 43 are displayed. Specifically, the first operation acceptance unit 34 accepts a rearrangement operation for changing the order in which the transmission preview images 70 are arranged. The user performs an operation by using the operation unit 15.

Figure 9:
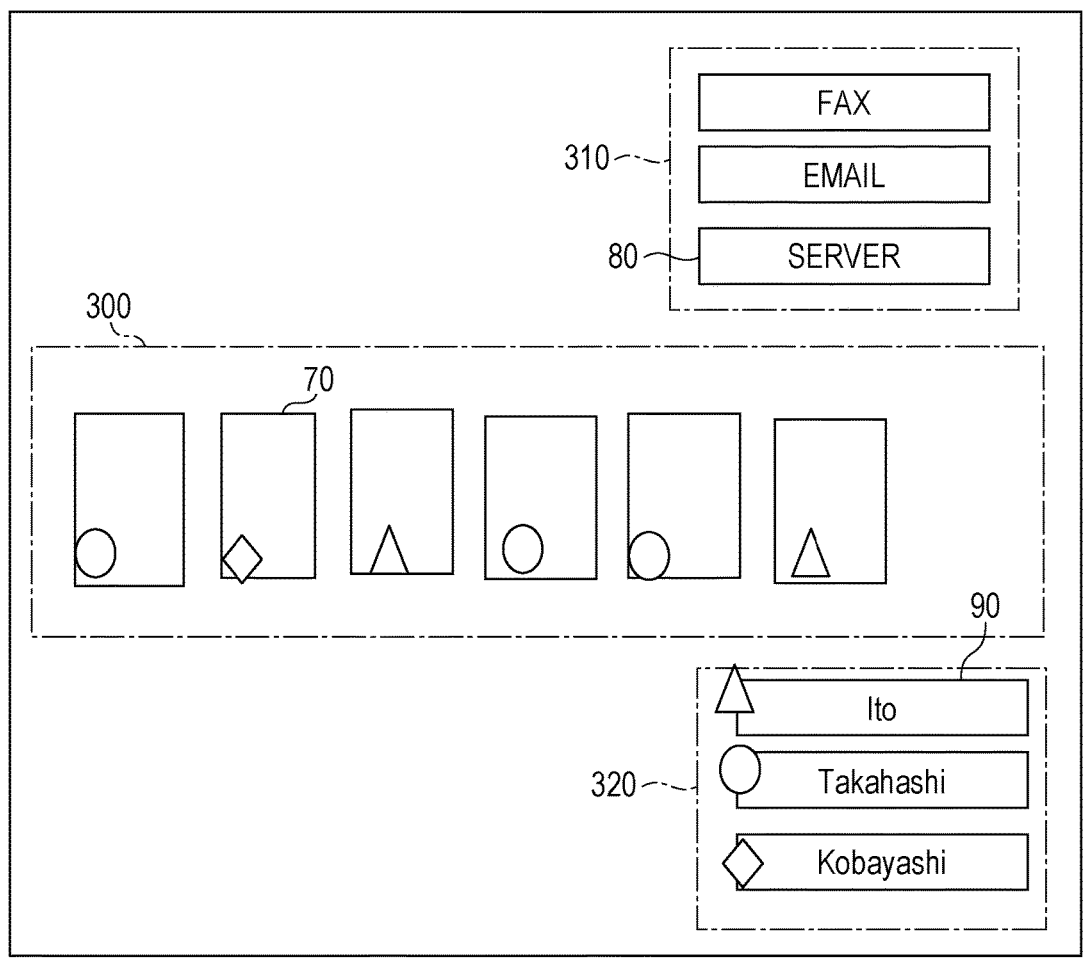
FIG. 9 illustrates an example of a transmission control screen.

FIG. 9 illustrates an example of the transmission control screen. As illustrated by way of example in FIG. 9, the transmission control screen has a transmission preview image area 300 for displaying the transmission preview images 70, a transmission method image area 310 for displaying the transmission method images 80, and a transmission destination image area 320 for displaying the transmission destination images 90. In FIG. 9, the transmission destination images 90 are images associated with destination user names. Alternatively, the transmission destination images 90 may be images associated with destination user IDs, email addresses, or facsimile numbers. In FIG. 9, the transmission preview images 70 are displayed in order from left to right, by way of example.

When a user drags and drops any of the transmission preview images 70 in front of or behind another transmission preview image 70 with the mouse, their finger, or the like, the second operation acceptance unit 44 accepts a rearrangement operation for changing the order in which the transmission units in the transmission list are arranged. When the second operation acceptance unit 44 accepts the rearrangement operation, information on a transmission preview image 70 on which the rearrangement operation is to be performed and information indicating the changed position of the transmission preview image 70 after rearrangement are output. The information indicating the changed position may be, for example, information indicating a number indicating the changed position in the order. Accordingly, the rearrangement operation performed by a user may not necessarily involve a drag-and-drop operation of a transmission preview image 70, and may involve the following operation. For example, when a user specifies a transmission preview image 70 on which the rearrangement operation is to be performed by, for example, clicking or tapping it, an instruction for prompting the user to designate a number indicating the changed position of the transmission preview image 70 in the order after rearrangement may be output. When the user designates a number in accordance with the instruction, the second operation acceptance unit 44 may accept the rearrangement operation. The user may be allowed to rearrange the transmission preview images 70 as desired.

The rearrangement unit 45 rearranges the transmission units in the transmission list stored in the transmission list memory 26 in accordance with information output from the second operation acceptance unit 44 that has accepted the rearrangement operation performed by the user. Specifically, the number of the transmission unit corresponding to the transmission preview image 70 on which the rearrangement operation is to be performed is changed to a number corresponding to the changed position of the transmission unit after rearrangement, and the numbers of the transmission units which are larger than the number corresponding to the changed position are changed by adding value 1 to the numbers of the transmission units. Then, the transmission units are sorted in ascending order according to the changed numbers. Accordingly, the transmission units are rearranged.

The transmission list in which the transmission units have been rearranged is stored in the transmission list memory 26, and the existing transmission list is updated. When the transmission list is updated, the transmission preview image display unit 41 displays, on the display 14, the transmission preview images 70 based on the updated transmission list stored in the transmission list memory 26. Accordingly, the transmission control screen is also updated.

In accordance with a process execution request from a user, the transmission processing unit 46 obtains images to be transmitted which are associated with pieces of transmission information based on the transmission list stored in the transmission list memory 26, in accordance with the pieces of transmission information, from the image memory 24, and sequentially transmits the obtained images to be transmitted.

A user may also perform a rearrangement operation by using the transmission method images 80. First, a user specifies any of the transmission method images 80 on the transmission control screen by, for example, clicking or tapping it with the mouse, their finger, or the like. Then, the second operation acceptance unit 44 accepts a rearrangement operation for changing the order in which the transmission units in the transmission list are arranged. In this case, when the second operation acceptance unit 44 accepts the rearrangement operation, information on the specified transmission method image 80 is output. Then, the rearrangement unit 45 rearranges the transmission units in the transmission list stored in the transmission list memory 26 in accordance with the information on the specified transmission method image 80. The rearrangement unit 45 rearranges the transmission units so as to preferentially transmit a transmission unit associated with the transmission method indicated by the specified transmission method image 80 so that the transmission unit is transmitted earlier than the other transmission units. Specifically, the rearrangement unit 45 rearranges the transmission units so that a transmission unit associated with the transmission method indicated by the specified transmission method image 80 is placed first in the transmission list. Accordingly, the transmission processing unit 46 preferentially transmits a transmission unit associated with the transmission method indicated by the transmission method image 80 specified by the user so that the transmission unit is transmitted earlier than the other transmission units. The rearrangement unit 45 may rearrange the transmission units so that a transmission unit associated with the transmission method indicated by the specified transmission method image 80 is placed last in the transmission list. The transmission list in which the transmission units have been rearranged is stored in the transmission list memory 26, and the existing transmission list is updated. When the transmission list is updated, the transmission preview image display unit 41 displays, on the display 14, the transmission preview images 70 based on the updated transmission list stored in the transmission list memory 26. Accordingly, the transmission control screen is also updated.

A user may also perform a rearrangement operation by using the transmission destination images 90. First, a user specifies any of the transmission destination images 90 on the transmission control screen by, for example, clicking or tapping it with the mouse, their finger, or the like. Then, the second operation acceptance unit 44 accepts a rearrangement operation for changing the order in which the transmission units in the transmission list are arranged. In this case, when the second operation acceptance unit 44 accepts the rearrangement operation, information on the specified transmission destination image 90 is output. Then, the rearrangement unit 45 rearranges the transmission units in the transmission list stored in the transmission list memory 26 in accordance with the information on the specified transmission destination image 90. The rearrangement unit 45 rearranges the transmission units so as to preferentially transmit a transmission unit associated with the transmission destination indicated by the specified transmission destination image 90 so that the transmission unit is transmitted earlier than the other transmission units. Specifically, the rearrangement unit 45 rearranges the transmission units so that a transmission unit associated with the transmission destination indicated by the specified transmission destination image 90 is placed first in the transmission list. Accordingly, the transmission processing unit 46 preferentially transmits a transmission unit associated with the transmission destination indicated by the transmission destination image 90 specified by the user so that the transmission unit is transmitted earlier than the other transmission units. The rearrangement unit 45 may rearrange the transmission units so that a transmission unit associated with the transmission destination indicated by the specified transmission destination image 90 is placed last in the transmission list. The transmission list in which the transmission units have been rearranged is stored in the transmission list memory 26, and the existing transmission list is updated. When the transmission list is updated, the transmission preview image display unit 41 displays, on the display 14, the transmission preview images 70 based on the updated transmission list stored in the transmission list memory 26. Accordingly, the transmission control screen is also updated.

Furthermore, the rearrangement unit 45 may refer to a transmission list and rearrange the transmission units in accordance with the number of users associated as transmission destinations. Specifically, the rearrangement unit 45 may rearrange the transmission units so as to preferentially transmit a transmission unit including a large number of users associated as transmission destinations so that the transmission unit is transmitted earlier than the other transmission units. In this case, a transmission unit with which a large number of users are associated as transmission destinations is transmitted to the users earlier than a transmission unit with which a small number of users are associated as transmission destinations is. Conversely, the rearrangement unit 45 may rearrange the transmission units so as to preferentially transmit a transmission unit including a small number of users associated as transmission destinations. In this case, a transmission unit with which a small number of users are associated as transmission destinations is transmitted to the users earlier than a transmission unit with which a large number of users are associated as transmission destinations is. In this case, an instruction image for giving instructions for rearrangement in accordance with the number of users associated as transmission destinations is included in the transmission control screen. When a user specifies the instruction image, the second operation acceptance unit 44 accepts a rearrangement operation for changing the order in which the transmission units in the transmission list are arranged. The transmission list in which the transmission units have been rearranged is stored in the transmission list memory 26, and the existing transmission list is updated. When the transmission list is updated, the transmission preview image display unit 41 displays, on the display 14, the transmission preview images 70 based on the updated transmission list stored in the transmission list memory 26. Accordingly, the transmission control screen is also updated.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An apparatus comprising at least one central processing unit (CPU) configured to:

perform an association, in accordance with a user operation, of a preview image among one or more preview images displayed on a display with at least one transmission information image among a plurality of transmission information images displayed on the display, each of the transmission information images indicating both a transmission method and a transmission destination; and transmit an image of the preview image to the transmission destination by the transmission method indicated by the transmission information associated with the preview image, wherein the preview image and the transmission information image are simultaneously displayed on the display during the association.

2. The apparatus according to claim 1, wherein, in response to one of the transmission information images being specified in accordance with a user operation, the at least one CPU displays on the display preview images that have been associated with the specified transmission information image.

3. The apparatus according to claim 2, wherein, in response to a transmission method being specified in accordance with a user operation, the at least one CPU displays on the display preview images that have been associated with the transmission method.

4. The apparatus according to claim 2, wherein, in response to a transmission destination being specified in accordance with a user operation, the at least one CPU displays on the display an image associated with the transmission destination.

5. The apparatus according to claim 1, wherein, in response to one of the transmission information images being specified in accordance with a user operation, the at least one CPU displays on the display only preview images that have been associated with the specified transmission information image, and does not display preview images that have not been associated with the specified transmission information image.

6. The apparatus according to claim 1, wherein, in response to the association of the preview image with the transmission information image, the at least one CPU displays the transmission information image on the display in association with the preview image.

7. The apparatus according to claim 6, wherein, in response to one of the transmission information images being specified in accordance with a user operation, the at least one CPU displays on the display only preview images that have been associated with the specified transmission information image, and does not display preview images that have not been associated with the specified transmission information image.

8. The apparatus according to claim 6, wherein, in response to one of the transmission information images being specified in accordance with a user operation, the at least one CPU displays on the display preview images that have been associated with the specified transmission information image.

9. The apparatus according to claim 8, wherein, in response to a transmission method being specified in accordance with a user operation, the at least one CPU displays on the display preview images that have been associated with the transmission method.

10. The apparatus according to claim 8, wherein, in response to a transmission destination being specified in accordance with a user operation, the at least one CPU displays on the display an image associated with the transmission destination.

11. The apparatus according to claim 6, wherein the at least one CPU is further configured to:
    display a plurality of transmission preview images, each transmission preview image indicating a preview image of an image to be transmitted and a transmission information image that has been associated with the preview image,
    wherein the at least one CPU transmits the images to be transmitted that are based on the preview images of the transmission preview images to the associated transmission destination using the associated transmission method indicated by the transmission information image of the transmission preview image, in accordance with a display order of the transmission preview images.

12. The apparatus according to claim 11, wherein the at least one CPU is further configured to:
    rearrange the display order of the plurality of transmission preview images in accordance with a user operation,
    wherein the at least one CPU transmits the images in accordance with the rearranged display order.

13. The apparatus according to claim 12, wherein, in response to a transmission method being specified in accordance with a user operation, the at least one CPU rearranges the display order of the plurality of transmission preview images to prioritize transmission preview images associated with the specified transmission method.

14. The apparatus according to claim 1, wherein the at least one CPU is further configured to:
    display a plurality of transmission preview images, each transmission preview image indicating a preview image of an image to be transmitted and a transmission information image that has been associated with the preview image,
    wherein the at least one CPU transmits the images to be transmitted that are based on the preview images of the transmission preview images to the associated transmission destination using the associated transmission method indicated by the transmission information image of the transmission preview image, in accordance with a display order of the transmission preview images.

15. The apparatus according to claim 14, wherein the at least one CPU is further configured to:
    rearrange the display order of the plurality of transmission preview images in accordance with a user operation,
    wherein the at least one CPU transmits the images in accordance with the rearranged display order.

16. The apparatus according to claim 15, wherein, in response to a transmission method being specified in accordance with a user operation, the at least one CPU rearranges the display order of the plurality of transmission preview images to prioritize transmission preview images associated with the specified transmission method.

17. The apparatus according to claim 15, wherein, in response to a transmission destination being specified in accordance with a user operation, the at least one CPU rearranges the display order of the plurality of transmission preview images to prioritize transmission preview images associated with the specified transmission destination.

18. The apparatus according to claim 1, wherein the preview image is a reduced image or a compressed image that is to be transmitted.

19. A non-transitory computer readable medium storing a program causing a computer to execute a process, the process comprising: displaying one or more preview images and one or more transmission information images on a display, each of the transmission information images indicating both a transmission method and a transmission destination; performing an association, in accordance with a user operation, of a preview image among the one or more displayed preview images with at least one transmission information image among the displayed transmission information images; and transmitting an image of the preview image to the transmission destination by the transmission method indicated by the associated transmission information image of the preview image, wherein the preview image and the transmission information image are simultaneously displayed on the display during the association.

20. A method comprising: displaying one or more preview images and one or more transmission information images on a display, each transmission information image indicating both a transmission method and a transmission destination; performing an association, in accordance with a user operation, of a preview image among the one or more displayed preview images with at least one transmission information image among the displayed transmission information images; and transmitting an image of the preview image to the transmission destination by the transmission method indicated by the transmission information image associated with the preview image, wherein the preview image and the transmission information image are simultaneously displayed on the display during the association.

21. An apparatus comprising at least one central processing unit (CPU) configured to:
    display, on a display, one or more preview images, each preview image based on an image to be transmitted, and one or more transmission information images, each transmission information image indicating both a transmission method and a transmission destination;
    in response to a transmission information image being dragged and dropped onto a preview image, associate the transmission method and transmission destination of the transmission information image with the preview image; and
    transmit the image on which the preview image is based, to the transmission destination by the transmission method indicated by the transmission information image that has been associated with the preview image,
    wherein, in response to the transmission information image being dragged and dropped onto the preview image, the at least one CPU displays an icon indicating the association of the transmission information image with the preview image, in the preview image.

* * * * *